June 21, 1966   R. T. JOLLY   3,257,025
INSULATING TUMBLER
Filed Feb. 12, 1964   2 Sheets-Sheet 1
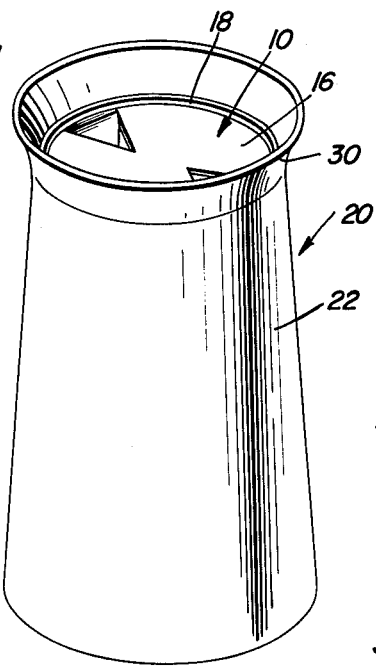
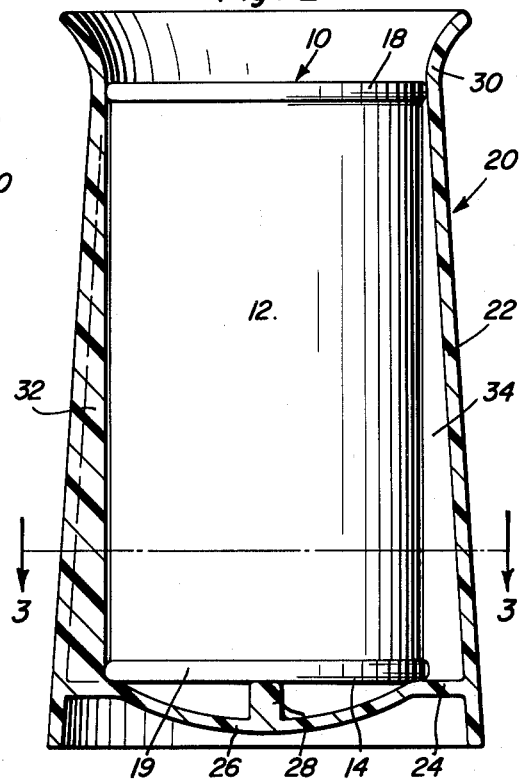
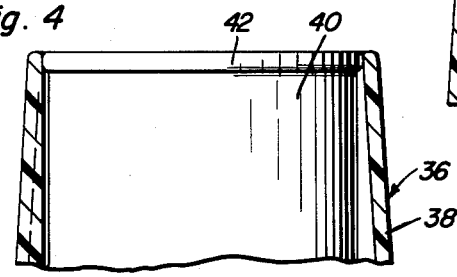
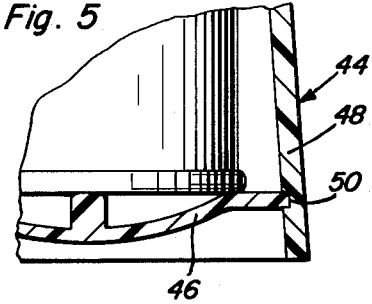
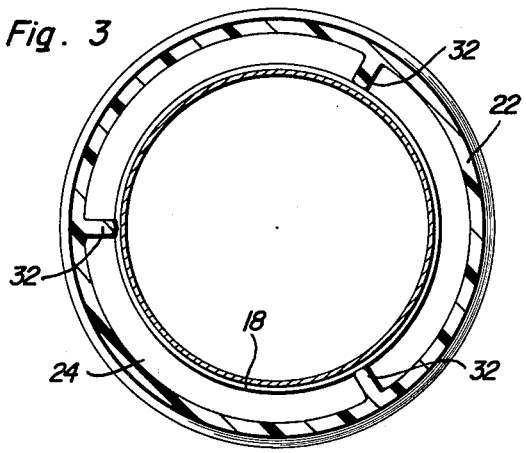
Ross T. Jolly
INVENTOR.
BY *Clarence A. O'Brien*
*and Harvey B. Jacobson*
Attorneys June 21, 1966  R. T. JOLLY  3,257,025
INSULATING TUMBLER Filed Feb. 12, 1964  2 Sheets-Sheet 2

Ross T. Jolly
INVENTOR.

BY *[signatures]*
Attorneys

United States Patent Office 3,257,025
Patented June 21, 1966

3,257,025
INSULATING TUMBLER
Ross T. Jolly, 10116 San Juan Ave., South Gate, Calif.
Filed Feb. 12, 1964, Ser. No. 344,426
7 Claims. (Cl. 220—85)

This invention relates to a novel and useful insulating tumbler and more specifically to a generally cylindrical tumbler adapted to have an open topped container disposed therein with the upstanding side walls of the container maintained in spaced relation relative to the upstanding side walls of the container.

The insulative tumbler of the instant invention is constructed in a manner whereby it is specifically adapted for use in connection with beverages which are marketed in can-type containers such as those utilized to market beer and soft drinks.

Beer and soft drinks are marketed in cans for several reasons. A very important one of these reasons is that the drink contained within a can may be more readily chilled than a drink disposed within a glass or cardboard container. However, while cans allow the liquids disposed therein to be readily chilled they also allow the chilled liquid to be more quickly warmed. Heat transfer between the liquid within a container and the ambient atmosphere is quite rapid when the container is constructed of a metallic substance such as tin or aluminum. Consequently, when hot liquids are served in metallic containers the container sometimes gets too hot to grip by hand. Further, when the metallic container encloses a chilled liquid, the container has a tendency to "sweat" and the placement of a sweating container on a piece of furniture or the like can cause the familiar objectionable rings or stains to be made on furniture surfaces.

It is accordingly a main object of this invention to provide an insulative tumbler in which metallic containers of both chilled and heated liquids may be disposed so as to lessen the rate of heat transfer between the liquid within the container and the ambient atmosphere.

Another object of this invention, in accordance with the preceding object, is to provide an insulative tumbler for both hot and cold beverages marketed in cans and constructed in a manner whereby the can or metallic container is frictionally retained within the tumbler to prevent accidental removal of the container from the insulative tumbler.

Yet another object of this invention, in accordance with the immediately preceding object, is to provide an insulative tumbler including means by which a metallic container such as a can disposed therein may be readily ejected therefrom.

Still another object of this invention is to provide an insulative tumbler for a metallic container including means by which a person's grip on the tumbler may be improved.

A final object of this invention to be specifically enumerated herein is to provide an insulative tumbler in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of one form of insulative tumbler constructed in accordance with the present invention shown with a conventional-type of metallic liquid container disposed therein;

FIGURE 2 is an enlarged fragmentary transverse vertical sectional view taken substantially upon a plane passing through the longitudinal centerline of the embodiment illustrated in FIGURE 1;

FIGURE 3 is a horizontal sectional view taken substantially upon a plane indicated by the section line 3—3 of FIGURE 2;

FIGURE 4 is a fragmentary vertical sectional view similar to that of FIGURE 2 but showing a modified form of insulative tumbler;

FIGURE 5 is a fragmentary vertical sectional view similar to that of FIGURE 2 but showing a further modified form of insulative tumbler including a removable bottom wall;

Figure 6:
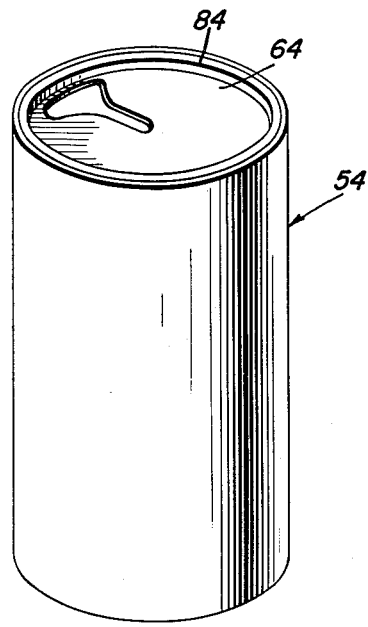
FIGURE 6 is a perspective view of yet another modified form of insulative tumbler shown with a metallic container disposed therein.

Referring now more specifically to the drawings the reference numeral 10 generally designates a conventional form of metallic container including upstanding cylindrical side walls 12, a bottom wall 14 and a top wall 16. The side walls 12 include upper and lower outwardly projecting peripheral flanges 18 and 19, respectively, which are formed when the top and bottom walls 16 and 14 are secured to the cylindrical side walls 12.

The insulating tumbler of the instant invention is generally designated by the reference numeral 20 and includes cylindrical side walls 22 having a bottom wall 24 extending between their lower ends. The bottom wall 24 is spaced above the lower terminal end portions of the cylindrical sides or side walls of the tumbler 20 and includes a dished central portion 26 having an upstanding and centrally disposed projection or abutment 28. From FIGURE 2 of the drawings it may be seen that the side walls 22 project above the upper end of the container 10 and that they are flared as at 30 at the upper end of the tumbler 20. Further, it may be noted that the flared portion of the tumbler 20 begins at the plane in which the upper surfaces of the container 10 are disposed, the container 10 being snugly received within the tumbler 20 with its lower edges abutting against the outer peripheral portions of the bottom wall 24 and the center of its bottom wall 14 abutting against the upper end of the abutment or projection 28.

The tumbler 20 also includes a plurality of longitudinally extending, inwardly projecting and circumferentially spaced ribs 32 which snugly embrace the side walls 12 and the flange 19 between their inner edge portions.

In operation, the container 10, having either hot or cold liquid therein, may be inserted within the tumbler 20 thereby forming a dead air space 34 between the inner surfaces of the side walls 22 of the tumbler and the outer surfaces of the side walls 12 of the container 10. The tumbler 20 may be constructed of slightly resilient plastic material.

The flared portion 30 of the tumbler 20 defines a pouring or drinking lip and when it is desired to remove the container 10 from within the tumbler 20, the sides of the tumbler intermediate the ribs 32 may be deflected inwardly which will in effect shorten the distance between the bottom wall 24 and the flared portion 30. The foreshortening of this distance will cause the flange 18 to be moved into the flared portion of the tumbler thus releasing the gripping action of the minor diameter end portion of the tumbler 20 on the upper flange 18. It is to be understood that the minor diameter of the upper end of the tumbler 20, when the latter is in a relaxed state, is slightly more than the diameter of the side walls of the container below the flange 18. Therefore, after the flange 18 has been moved into the flared portion of the tumbler 20, the entire assembly may be inverted in order that the upper half of the container 10 may slide outwardly of the inverted upper end of the tumbler 20. Thereafter, the upper end of the container 10 may be grasped in order to pull the remainder of the container 10 past the minor diameter upper end portion of the tumbler 20. In addition, the dished portion 26 of the bottom wall 24 may be deflected upwardly thereby causing the projection or abutment 28 to forcibly eject the upper end of the container 10 into the flared upper end portion of the tumbler or completely above the flared portion 30.

With attention now directed more specifically to FIGURE 4 of the drawings, there will be seen a modified form of tumbler generally designated by the reference numeral 36 which is substantially identical to the tumbler 20 but which does not include the flared portion 30 and whose side walls 38 terminate upwardly in the plane containing the upper surfaces of the container 40 disposed within the tumbler 36. When it is desired to remove the tumbler 40 from the tumbler 36, the side walls 38 may be deflected upwardly so as to shorten the side walls 38 and cause the upper peripheral flange 42 of the container 40 to be positioned above the upper end of the tumbler 36 in order that the flange 42 may be grasped in order to withdraw the container 40 from the tumbler 36.

With attention now directed more specifically to FIGURE 5 of the drawings there will be seen a still further modified form of tumbler generaly referred to by the reference numeral 44 whose upper end may be formed similar to either of the tumblers 20 and 36 but whose dished bottom wall 46 is formed separately from the side walls 48 thereof. In this instance, the side walls 48 include an inwardly opening circumferential groove 50 in which the outer peripheral portions of the dished bottom wall 46 are received in order to secure the bottom wall 46 to the side walls 48.

Figure 7:
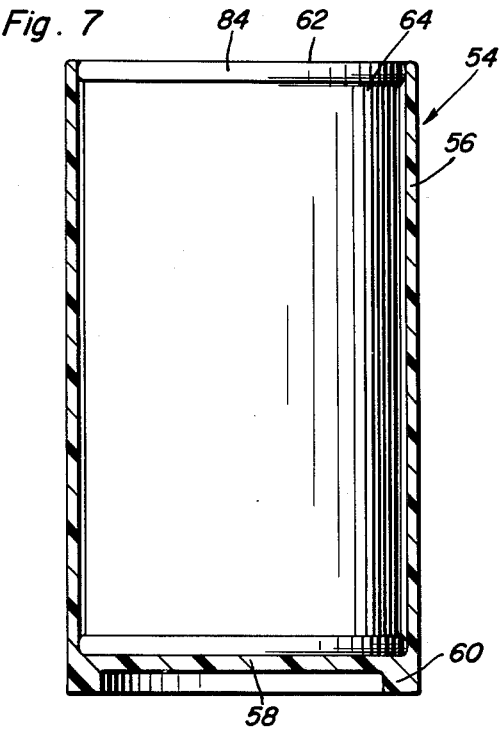
FIGURE 7 is an enlarged transverse vertical sectional view taken substantially upon the plane passing through the longitudinal centerline of the embodiment of FIGURE 6.

With attention now directed more specifically to FIGURES 6 and 7 of the drawings there will be seen a still further modified form of tumbler generally referred to by the reference numeral 54 whose side walls 56 are substantially cylindrical as opposed to the truncated cone-shaped side walls 22, 38 and 48 of the tumblers 20, 36 and 44, respectively. The tumbler 54 includes a substantially planar bottom wall 58 and it may be seen that the lower ends of the side walls 56 disposed below the bottom 58 are thickened as at 60 to provide reinforcement for the lower ends of the side walls 56.

The upper ends of the side walls 56 terminate in a plane containing the upper surfaces 62 of the container 64 disposed within the tumbler 54 as do the side walls 38 of the container 36.

Figure 8:
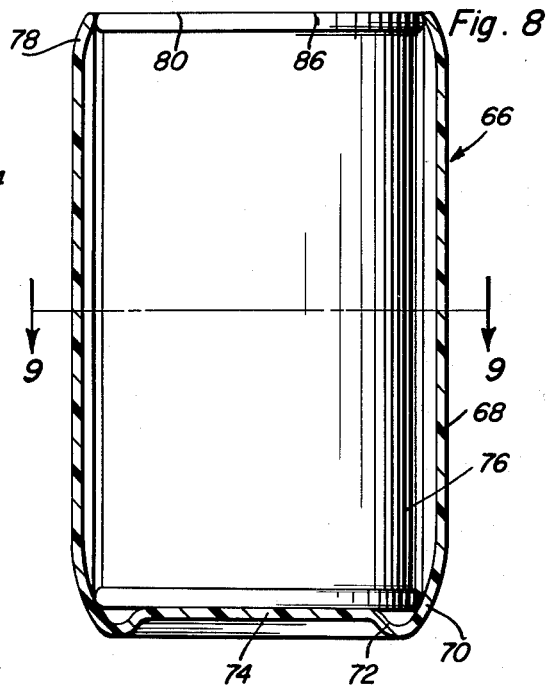
FIGURE 8 is a vertical transverse vertical sectional view similar to that of FIGURE 7 but showing yet another modified form of the invention.
Figure 9:
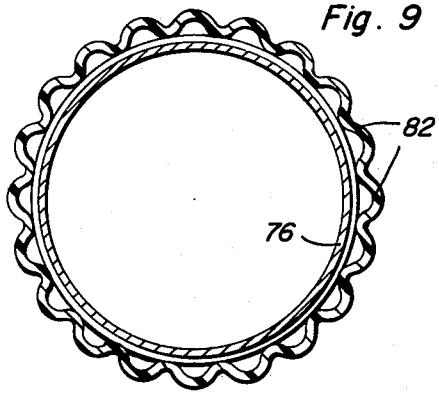
FIGURE 9 is a horizontal sectional view taken substantially upon the plane indicated by the section line 9—9 of FIGURE 8.

With attention now directed more specifically to FIGURES 8 and 9 of the drawings there will be seen a fifth form of the invention generally referred to by the reference numeral 66. The tumbler 66 includes side walls 68 which curve inwardly as at 70 at the lower ends and then upwardly as at 72. A raised bottom wall 74 extends between the inwardly and upwardly curving portion 72 of the side walls 68 and the lower end of the container 76 disposed within the tumbler 66 abuts against the upper surface of the bottom wall 74. In addition, the upper ends of the side walls 68 curve inwardly as at 78 and terminate in a plane in which the upper surfaces 80 of the container 76 are disposed. Further, from FIGURE 9 of the drawings it may be seen that the side walls 68 of the tumbler 66 are circumferentially corrugated as at 82. The corrugations 82 provide a means whereby the tumbler 66 may be gripped more effectively so as to reduce the possibility of the tumbler 66 slipping from the grip of the person holding the tumbler.

The tumblers 54 and 66 each operate in a manner similar to that in which the tumblers 20, 36 and 44 operate in that the side walls 56 and 68 thereof may be inwardly deflected to move the upper flanges 84 and 86 of the containers 64 and 76, respectively, outwardly of the upper end of the tumblers 54 and 56. In addition, the bottom walls 58 and 74 may also be inwardly deflected to urge the upper ends of the containers 64 and 76 from within the tumblers 54 and 66, respectively. Still further, the inwardly curving portions 70 of the side walls 68 may be squeezed to cam the container 76 out of the lower end of the tumbler 66. In addition, the bottom wall 74 and the upwardly curving portion of the side walls 68 of the tumbler 66 may be omitted if desired, the inwardly curving portions 70 of the side walls 68 providing support for the bottom of the container 76, and the abutment 28 may be formed as a separate item mounted from the bottom wall for vertical reciprocation. Finally, the groove 50 could be made with a greater axial extent whereby the bottom wall 46 would then be axially reciprocable therein and could be constructed of rigid or semirigid material and still utilized to eject a container from within the tumbler 44.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, an upright container including an upstanding side wall and a bottom wall, said side wall including upper and lower outwardly projecting peripheral flanges at its upper and lower ends, an outer insulative tumber including an upstanding side wall and a bottom wall, said tumbler bottom wall including at least central portions thereof spaced above the lower end of the side wall of said tumbler and adapted to be abutted by the bottom of said container and to support the latter, means for spacing the side wall of said tumbler outwardly of the side wall of said container, a portion of the side wall of said tumbler being disposed above the upper end of said container, said portion of said side wall of said tumbler being upwardly flared and defining a pouring lip extending about the upper end of said container, said upper flange being snugly received in the upper end of said tumbler with the outer surface of said upper flange frictionally engaging the inner surface of the side wall of said tumbler adjacent the lower end of said pouring lip, the side wall of said tumbler being yieldable wherein said side wall may be inwardly deflected intermediate its upper and lower ends so as to shorten the overall height of said tumbler side wall from said tumbler bottom wall to said inner surface of said tumbler side wall whereby the lowermost portions of said inner surface will move below said upper flange.

2. In combination, an upright container including an upstanding side wall and a bottom wall, an outer insulative tumbler including an upstanding side wall and bottom wall, said tumbler bottom wall including an outer continuous peripherally extending flat portion and a centrally located downwardly convex portion defining an internal recess, said container being received within said tumbler with the side wall of said tumbler spaced outwardly of the side wall of said container, the bottom wall of said container extending to a point adjacent said convex portion, said convex portion being flexible upwardly against the bottom wall of said container whereby said container may be forced upwardly in said tumbler, and means mounted on the bottom wall of said tumbler for transmitting force to said container when said convex portion is flexed upwardly.

3. The combination of claim 2 wherein said force transmitting means comprises upstanding abutment means in said recess extending upwardly to the plane defined by said peripheral flat portion, the bottom wall of said container extending adjacent said abutment means whereby said abutment means will be moved into contact with the bottom wall of said container when said convex portion is flexed upwardly thereby forcing said container upwardly in said tumbler.

4. The combination of claim 3 wherein said abutment means is equally radially spaced inwardly from said peripheral flat portion thereby being centrally located on the bottom wall of said tumbler whereby said abutment means is located at the point of greatest upward deflection of said convex portion.

5. The combination of claim 2 wherein said container includes an upper portion in frictional contact in the upper end of said tumbler with the upper portion frictionally engaging the inner surface of the side wall of said tumbler, said inner surface, immediately above the upper portion of said container, being laterally outwardly directed, the side wall of said tumbler being yieldable wherein it may be inwardly deflected intermediate its upper and lower ends so as to shorten the over-all height of said tumbler side wall from the tumbler bottom wall to the laterally directed inner surface of said tumbler side wall.

6. The combination of claim 5 wherein the upper end of said tumbler side wall disposed above the upper portion of said container is upwardly flared and defines a pouring lip extending about and projecting appreciably above the upper portion of said container.

7. The combination of claim 2 wherein the side wall of said tumbler is yieldable wherein it may be inwardly deflected intermediate the upper and lower end thereof so as to shorten the over-all height of said tumbler side wall.

References Cited by the Examiner
UNITED STATES PATENTS

| Re. 25,618 | 7/1964 | Goodman | 220—15 |
|---|---|---|---|
| 973,085 | 10/1910 | Strause | 215—100.5 |
| 1,381,071 | 6/1921 | Flannery. | |
| 1,771,765 | 7/1930 | Benson | 229—1.5 |
| 1,868,773 | 7/1932 | Staake. | |
| 2,533,349 | 12/1950 | Burger | 215—12 |
| 2,808,090 | 10/1957 | Casalino. | |
| 2,838,202 | 6/1958 | Huether | 220—90.6 |
| 2,895,636 | 7/1959 | Martin | 220—15 |
| 2,944,700 | 7/1960 | Stevenson | 215—100.5 |
| 3,013,691 | 12/1961 | Prentice | 220—15 |

THERON E. CONDON, *Primary Examiner.*

R. H. SCHWARTZ, *Assistant Examiner.*